Patented Nov. 26, 1929

1,737,391

UNITED STATES PATENT OFFICE

WINFIELD SCOTT, OF AKRON, OHIO, ASSIGNOR TO THE RUBBER SERVICE LABORATORIES CO., OF AKRON, OHIO, A CORPORATION OF OHIO

MANUFACTURING DERIVATIVES OF ALDEHYDE-AMINE REACTION PRODUCTS

No Drawing. Original application filed September 9, 1925, Serial No. 55,386. Divided and this application filed May 19, 1926. Serial No. 110,293.

The present invention is directed to the art of manufacturing certain chemical compounds useful as accelerators of the rubber vulcanization process. The invention is concerned particularly with the process of manufacturing the carbon disulfid derivatives of the reaction product of certain aldehydes and amines as is hereinafter fully set forth and described. The present application is a division of an application Serial No. 55,386 filed September 9, 1925.

It is well known in chemistry that the aldehydes and particularly the aliphatic aldehydes, react with certain types of organic compounds such as the amines and certain amino derivatives and the like to produce new materials known as condensation products. These products are commonly termed Schiff's bases. Not only do aldehydes react in this manner with the primary amino compounds, but they will likewise combine or condense with the secondary amines.

Thus, one molecular proportion of a secondary amino compound, for example, 85 parts of piperidine, may be combined with an aldehyde in its simple or polymeric form, for example with tri-oxy-methylene, in an amount equivalent to ½ molecular proportion of formaldehyde. This quantity will be approximately 15 parts, if paraformaldehyde be used. This reaction may be carried out in the presence of a suitable solvent or without the use of a solvent, as desired. In either case, a reaction follows at once, and complete combination of the materials with the separation of water of condensation, takes place. The product, in the case of the compounds hereinbefore mentioned, is an oily liquid, having a boiling point of about 237° centigrade and a formula that is substantially as follows:

$C_5H_{10}N-CH_2-N.C_5H_{10}$.

This compound will react with carbon bisulfid, for example, in an amount equivalent to one molecular proportion thereof, to produce a product which is oily in nature, but which, upon seeding with a crystal or otherwise suitably treating, changes into a crystalline form. The carbon bisulfid reaction product of the condensation product of other secondary amines, and particularly of other cyclic amines preferably containing a nitrogen atom in the ring, with aldehydes or polymers thereof may be prepared in a similar manner. Thus, in place of piperidine mentioned, di-ethylene-di-amine, pyrollidine, piperazine, hydroquinoline, alkyl derivatives such as alpha-alkyl- or beta-alkylpiperidine, the alkyl derivatives of cyclic amines, tetra-hydro-quinaldine, and di-benzyl-amine and other secondary aliphatic and aromatic amines, the dialkylamines such as diethylamine as well as hydro-collidine and other compounds present in commercial pyridine may be used. These various compounds and other related materials may be combined in the proportions stated or in other proportions if desired, with aldehydes such as formaldehyde, or acetaldehyde and their polymeric forms, or with propionaldehyde, butraldehyde, isovaleric aldehyde and other aliphatic aldehydes, with acrolein or crotonaldehyde or other unsaturated aldehydes, with oxy-aldehydes such as aldol, or with aromatic aldehydes such as benzaldehyde, cinnamic aldehyde and the like or with ring compounds such as furfuraldehyde, and the product reacted with carbon bisulfid in the manner as described.

It is also apparent from the examples hereinbefore given that other compounds comprising my preferred type of accelerators may be readily manufactured. Thus, for example, I may combine di-benzyl-amine, dissolved in any suitable solvent or not, as desired, in the proportion of two molecular proportions thereof with one molecular proportion of paraformaldehyde and obtain a white crystalline product melting at substantially 99° centigrade. This product may be dissolved in a solvent such as ether and combined with an equal molecular proportion of carbon bisulfid whereupon there is obtained a product which upon recrystallization from ligroin, melts at approximately 64° C.

Another type of product included within the scope of my present invention may be conveniently prepared by reacting two molecular proportions of a di-amine, such as di-ethyl-amine, di-benzyl-amine and analogous compounds with one molecular proportion of paraformaldehyde or a like material. This reaction may be carried out with or without the use of a solvent as desired, but it is necessary that the mixure be kept from becoming too hot as the product formed is comparatively low boiling. The product, which is probably tetra-ethyl-di-amino-methane is a liquid which is slightly soluble in the water separating out from the reaction mixture. To the product obtained as described, there is added one molecular proportion of carbon bisulfid. This reaction may be carried out with or without the use of a solvent as desired, but if no solvent be used, the mixture should preferably be maintained below the boiling point of the product formed.

Another product having desirable rubber vulcanization accelerating properties may be prepared by reacting two molecular proportions of piperidine with one molecular proportion of furfuraldehyde and combining the product so obtained with one molecular proportion of carbon bisulfid. The tarry product so obtained is then ready for use as an accelerator of the rubber vulcanization process. If propion-aldehyde be used in place of furfuraldehyde in the example as just given, and the product reacted with carbon disulfide, the resulting product is found to possess valuable properties as a rubber vulcanization accelerator.

It is to be understood that my invention is not limited by any theory set forth in explanation of the facts involved nor are the examples given to be considered as at all limitative of my invention. My invention is to be regarded as defined solely by the claims hereinafter set forth wherein I intend to claim all novelty permissible in view of the prior art.

What I claim is:

1. The process of manufacturing the carbon disulfid derivative of an aldehyde-amine reaction product which comprises reacting a secondary amine with an aldehyde and reacting the product so obtained with carbon disulfid.

2. The process of manufacturing the carbon disulfid derivative of an aldehyde-amine reaction product which comprises reacting two molecular proportions of a secondary amine with one molecular proportion of an aldehyde, and reacting the product so obtained with one molecular proportion of carbon disulfid.

3. The process of manufacturing the carbon disulfid derivative of an aldehyde-amine reaction product which comprises reacting two molecular proportions of a di-aryl substituted secondary amine with one molecular proportion of an aliphatic aldehyde, and reacting the product so obtained with one molecular proportion of carbon disulfid.

4. The process of manufacturing the carbon disulfid derivative of an aldehyde-amine reaction product which comprises reacting di-benzyl-amine with a formaldehyde and reacting the product so obtained with carbon disulfid.

5. The process of manufacturing the carbon disulfid derivative of an aldehyde-amine reaction product which comprises reacting two molecular proportions of di-benzyl-amine with one molecular proportion of a formaldehyde and reacting the product so obtained with one molecular proportion of carbon disulfid.

6. The process of manufacturing the carbon disulfid derivative of an aldehyde-amine reaction product which comprises dissolving two molecular proportions of di-benzyl-amine in a suitable solvent therefor, adding to the solution one molecular proportion of paraformaldehyde, separating the product therefrom, dissolving the said product in ether, adding one molecular proportion of carbon disulfid to the solution and removing the solvent by evaporation from the resulting product.

7. The carbon disulfid derivative of an aldehyde-amine reaction product formed by reacting carbon disulfid on the reaction product of a secondary amine with an aldehyde.

8. The carbon disulfid derivative of an aldehyde-amine reaction product formed by reacting one molecular proportion of carbon disulfid on the reaction product of two molecular proportions of a secondary amine with one molecular proportion of an aldehyde.

9. The carbon disulfid derivative of an aldehyde-amine reaction product formed by reacting one molecular proportion of carbon disulfid on the reaction product of one molecular proportion of an aliphatic aldehyde and two molecular proportions of a di-aryl substituted secondary amine.

10. The carbon disulfid derivative of an aldehyde-amine reaction product formed by reacting carbon disulfid with the reaction product of di-benzyl-amine with a formaldehyde.

11. The carbon disulfid derivative of an aldehyde-amine reaction product formed by reacting one molecular proportion of carbon disulfid with the reaction product of two molecular proportions of di-benzyl-amine with one molecular proportion of a formaldehyde.

Signed at Akron, in the county of Summit and State of Ohio, this 14th day of May, A. D. 1926.

WINFIELD SCOTT.